United States Patent [19]

Jay et al.

[11] 4,111,801
[45] Sep. 5, 1978

[54] FILTRATION SYSTEM

[75] Inventors: John Jay, Halifax; Gary D. Bonner, Lower Sackville; Osmundo J. Betancourt, Halifax, all of Canada

[73] Assignee: Canplan Filtration Limited, Halifax, Canada

[21] Appl. No.: 816,468

[22] Filed: Jul. 18, 1977

Related U.S. Application Data

[63] Continuation of Ser. No. 673,888, Apr. 5, 1976, abandoned.

[30] Foreign Application Priority Data

Apr. 16, 1975 [GB] United Kingdom ............... 15716/75

[51] Int. Cl.² ............................................. B01D 33/14
[52] U.S. Cl. ....................................... 210/40; 210/70; 210/73 W; 210/77; 210/79; 210/160; 210/242 AS; 210/350; 210/400; 210/401
[58] Field of Search ................. 210/39, 40, 387, 400, 210/401, 526, DIG. 25, DIG. 26, 160, 216, 297, 359, 386, 350, 324, 329, 405, 456, 70, 73 W, 77, 79, 242 AS; 134/9, 15; 162/101, 275; 239/542, 548

[56] References Cited

U.S. PATENT DOCUMENTS

| | | | |
|---|---|---|---|
| 2,265,455 | 12/1941 | Serpas | 210/405 |
| 2,881,127 | 4/1959 | Hetzel | 210/401 |
| 3,690,466 | 9/1972 | Lee et al. | 210/387 |
| 3,836,006 | 9/1974 | Davis | 210/401 |
| 3,876,547 | 4/1975 | Kaess | 210/401 |

*Primary Examiner*—Frank Sever
*Attorney, Agent, or Firm*—Cushman, Darby & Cushman

[57] ABSTRACT

This relates to methods and apparatus for filtering liquids such as oil contaminated water. The apparatus includes spaced apart supply and take-up reels capable of storing an elongated compressed ribbon of flexible open cell foam thereon. In operation the ribbon of filtering medium, in the uncompressed state, extends between the supply and take-up means across a support such as a grid or screen which permits free flow of water through the filter medium. The contaminated water is supplied to the upper side of an exposed section of the filter medium through a system which evenly distributes the contaminated water over the exposed section of the filter medium. The water passing through the filter medium may be collected in a suitable tank or basin. When the exposed section of filter medium becomes so loaded with contaminants (such as oil) that the flow through the filter decreases, the ribbon is advanced to expose a fresh section. Means are provided for compressing the contaminated ribbon to extract contaminants therefrom before it is wound up on the take-up means. The recovered oil is directed to a receptacle. Both the supply and take-up means are provided with compression means which assist in compressing the ribbon of filter medium and maintaining same in the compressed state thereby contributing greatly to the compactness of the overall system.

16 Claims, 8 Drawing Figures

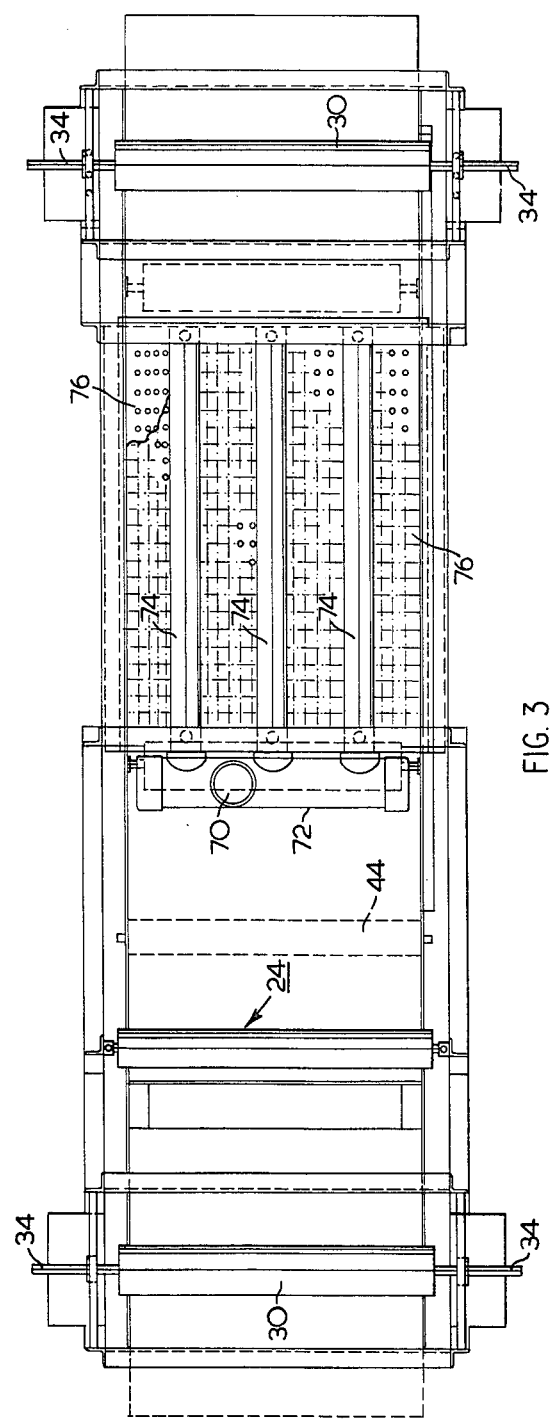

FILTRATION SYSTEM

This invention relates to improvements in methods and apparatus for filtering liquids especially oil contaminated water. The invention is particularly well suited for filtering ship bilge water and is also suitable for filtering industrial waste waters and oil contaminated water supplies.

It is known that certain materials, such as polyurethane, are capable of attracting and retaining oily substances on the surfaces thereof, i.e. they are oleophilic in nature. Typical commercially available open cell polyurethane foams have been found to be capable of providing a high filtering rate coupled with a high degree of filtering efficiency particularly in the lower (e.g. Bunker "C") and middle (e.g. Diesel fuel) distillate ranges.

The present invention is especially adapted for use with flexible open-cell foam filters capable of attracting and retaining oils thereon as described above.

One object of the invention is to provide a filter system for oil contaminated water which will enable filtered bilge water to be pumped directly from the ship into the surrounding water thus eliminating the need for bilge water pump out stops and the need for barges or holding tanks for storage of the oil contaminated bilge water. A further object is to provide a bilge water filtering system which is inexpensive, easy to operate and efficient enough for use even in environmentally sensitive areas including various inland waterways and in the far North. A further object of the invention is to provide a filtering system which is sufficiently compact that it can be installed in cramped locations close to existing bilge pumps and which is designed for installation with a minimum of time and cost to the owner either as a complete system or as an addition to existing systems. Another object is to design a filtering system wherein some of the oil which is filtered out can be reclaimed thus representing a further cost savings.

Many of the above noted objectives and advantages apply when the invention is used to filter oil contaminated industrial waste waters and oil contaminated water supplies. Industrial waste waters, after filtering, can be re-used or discharged into a lake or stream. In the case of contaminated water supplies, the filtering system can be readily mounted on a vehicle and transported to the site and connected to the water intake thus providing rapid emergency relief to endangered water supplies and protecting existing treatment facilities from contamination.

In one aspect there is provided apparatus for filtering contaminated liquids and adapted for use with an elongated ribbon of open cell plastics foam filtering material. The apparatus includes spaced apart supply means and take-up means each adapted for storing a length of the ribbon thereon with a length of the ribbon extending therebetween and arranged to allow the ribbon to be advanced from the supply means to the take-up means. A filter tray means is adapted to support a section of the length of ribbon of foam material in a generally horizontal position and is arranged to permit free drainage therefrom of liquids passing through the foam filtering material. Means are provided for distributing contaminated liquid substantially uniformly over the section of the ribbon which is supported on the filter tray. Means are provided for receiving the filtered liquid. The apparatus also includes means for squeezing the ribbon of foam material to remove contaminants therefrom as well as means for collecting the contaminants which have been squeezed from the ribbon.

In a further aspect of the invention the supply and take-up means each include means for rotatably supporting a core, such core being adapted to hold the wound up length of the ribbon thereon. Roll means are associated with each of the supply and take-up means for applying pressure to the wound up ribbon thereby to assist in maintaining the same in a compressed condition.

In accordance with a further feature, the supply and take-up means include generally upright guide means for guiding the roll means toward and away from the respective lengths of wound up ribbon on the cores as the amounts of wound up ribbon stored on the supply and take up means are varied. The roll means may be suitably weighted so as to apply the required compressive forces to the wound up ribbon.

The means for distributing contaminated liquid over the above mentioned section of the ribbon preferably include generally horizontal distribution plates having a plurality of relatively small spaced apertures therein, such plates being disposed over the filter tray. Suitable means, such as spray means, supply water to the upper side of the distribution plate. It is important that the contaminated liquid be applied uniformly over the section of the ribbon in order to avoid overloading of any one portion of the ribbon.

In a further feature of the invention, the above-noted means for squeezing the ribbon of foam preferably include a pair of squeeze rolls defining a nip between them through which the ribbon passes as it is advanced toward the take-up means, thereby to squeeze out contaminants which have collected in the ribbon.

The filter tray is provided with a grid-like bottom to permit free drainage of water away from the ribbon while at the same time providing adequate support therefor. The tray also includes upright side walls which inhibit by-pass of contaminated water around the foam ribbon, such tray further advantageously including sloping end walls to assist in free movement of the foam ribbon when the latter is advanced across the tray.

In a typical operation according to the invention, the ribbon filtering material, in the uncompressed state, is arranged such that it extends between the supply and take-up means with a section of the ribbon overlying the filter tray. The contaminated water is supplied to the upper side of the exposed section of ribbon with the contaminated water being evenly distributed over the exposed section of the ribbon. The clean water passing through the foam ribbon may be collected in a suitable tank or basin. The contaminants, e.g. the oil, collect in or on the foam ribbon. When the exposed section of ribbon becomes so loaded with contaminants that the flow of liquid therethrough decreases, the ribbon is advanced from the supply to the take-up means to expose a fresh section of the ribbon. As the ribbon is advanced, it is subjected to compression thereby to remove at least a portion of the contaminants from the ribbon. The contaminants (e.g. oil) are directed to a receptacle.

An illustrative embodiment of the invention will now be described with reference to the drawings wherein:

FIG. 3 is a plan view of the apparatus;

Figure 1:
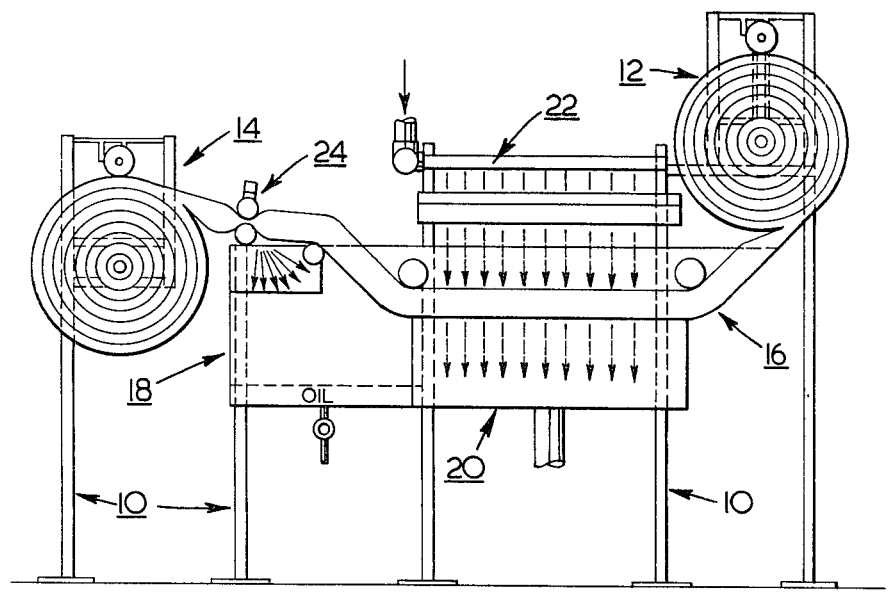
FIG. 1 is a diagrammatic side elevation view of apparatus according to the invention.

With reference to the drawings, FIG. 1 diagrammatically illustrates the main components of the apparatus. It will be seen that the apparatus includes a support frame 10 having spaced apart supply and take-up reel assemblies 12 and 14 respectively mounted thereon, each capable of holding and storing wound-up foam filter medium in a compressed state thereon. A filter tray 16 is mounted on frame 10 intermediate the supply and take-up assemblies 12 and 14. A water recovery tank 20 for filtered water is mounted on frame 10 immediately below the filter tray 16 to receive water passing through the filter medium. An in-feed distribution system for spreading contaminated water evenly over the filter medium is mounted above the filter tray 16 and is designated by reference numeral 22. A roll system 24 for squeezing oil from the contaminated filter medium as the latter is passed therethrough, is mounted on frame 10 between the take-up assembly 14 and the filter tray 16. An oil recovery tank 18 is disposed below the roll system 24 for collecting oily wastes which have been squeezed from the foam filter.

Figure 2:
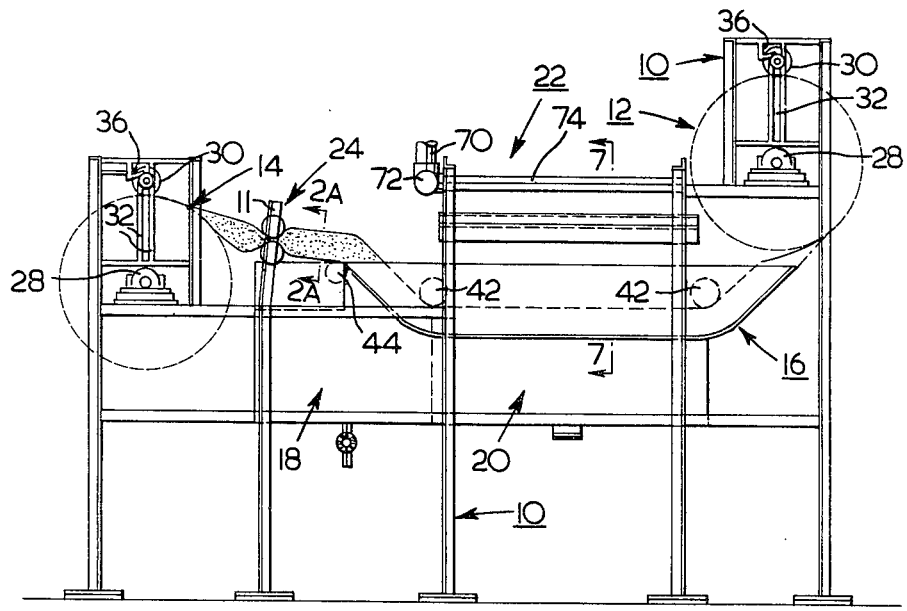
FIG. 2 is a view similar to that of FIG. 1 illustrating more clearly the details of construction.
Figure 4:
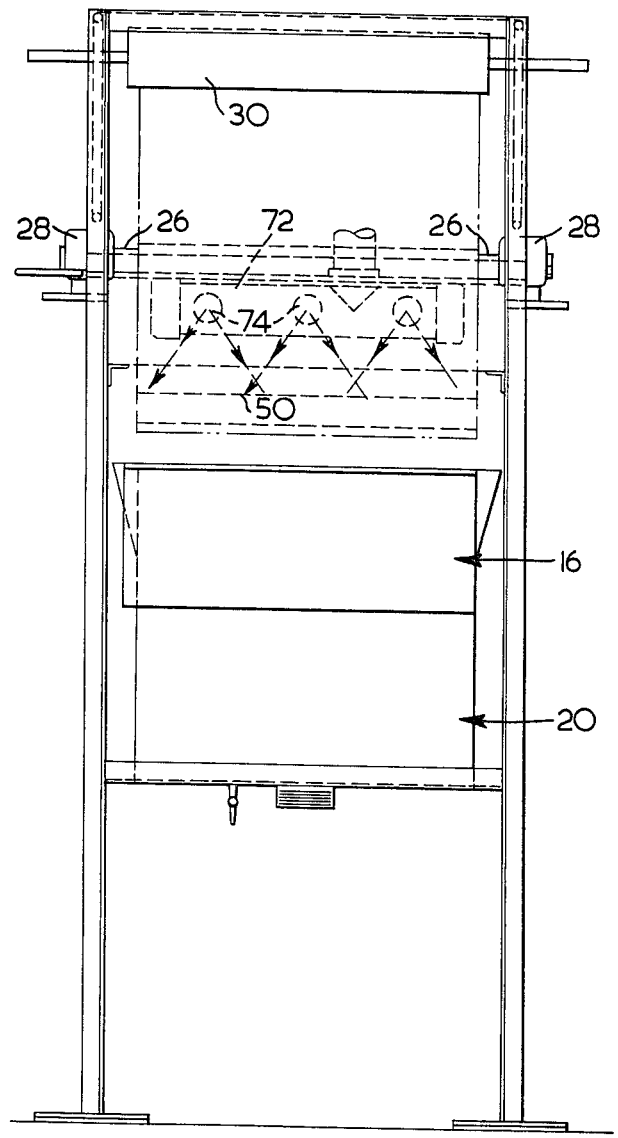
FIG. 4 is an end view of the apparatus looking towards the right hand end of the apparatus as seen in FIGS. 2 and 3.

With reference now to FIGS. 2-4 which show the apparatus in further detail, it will be seen that the supply and take-up reel assemblies 12 and 14 each include a cylindrical core 26 mounted for rotation in transversely spaced apart bearing blocks 28 each of which is affixed to frame 10. In order to allow the cylindrical cores 26 to be easily removed, the bearing blocks 28 are preferably each provided with short stub shafts (not shown) which project a short distance into the opposing ends of the core. One of each pair of transversely spaced bearing blocks 28 is provided with slotted guideways permitting limited axial motion thereof relative to the frame 20. Accordingly, when a core 28 is to be removed, the hold down bolts on its associated bearing block 28 are loosened and the bearing block is slid outwardly in the axial direction by a distance sufficient to release its stub shaft from the end of the core 26, after which the core may be swung outwardly and pulled away from the stub shaft of the opposing bearing block.

In order to effect rotation of the core on the take-up assembly 14 when it is desired to advance the ribbon of filter material, a hand crank (not shown) may be connected to one of the stub shafts mentioned above; alternatively a suitable motor and gear reduction drive assembly (not shown) can be utilized to rotate the take-up assembly.

The supply and take-up reel assemblies 12 and 14 also each include a presser roll 30 mounted directly above the respective cylindrical cores 26. Each presser roll 30 is made of a relatively heavy material so that the total weight of each roll is in the order of approximately 50 lbs. or somewhat more, thereby enabling rolls 30 to effect compression of the foam filter medium (illustrated by dashed lines in FIGS. 2, 3, and 4), which filter medium is wound up on the respective cores 26. This compression is applied in the radial direction. Each presser roll 30 is mounted above its associated core 26 for movement in a vertically disposed path toward and away from the cores as the amount of stored-up foam material on the cores 26 decreases and increases respectively. Vertically disposed, spaced apart guides 32 mounted on frame 10 which receive opposing end portions of roll shafts 34 of presser rolls 30 permit the above-mentioned movement of the presser rolls 30. The upper ends of guides 32 are provided with recesses 36 into which roll shafts 34 may be positioned to enable the presser rolls 30 to be held in elevated positions during removal of a core 26 holding thereon a used roll of filter material and/or replacement of a core 26 having a fresh roll of filter material thereon.

By virtue of the above-described presser roll arrangement the filter material on the reel assemblies 12 and 14 may be kept in a relatively tightly compressed rolled up condition. By way of example a nominal four inch thick open-cell polyurethane foam ribbon having a density of about 1.7 lbs./cu.ft. may be easily compressed to about a ½ inch thickness in the rolled condition. Those skilled in the art will readily see that a substantial saving in the overall space requirements may thus be effected.

Fresh rolls of filter material are prepared by feeding the filter material toward a core 26 while the latter is rotated to wind up the material thereon while at the same time radially directed forces are applied to the foam material being wound up on the core. These radially directed forces may be supplied by various means such as a plurality of presser rolls thereby compressing the foam to the desired degree and thus achieving a reduction in the amount of space required to store a given length of foam material on the core.

Figure 5:
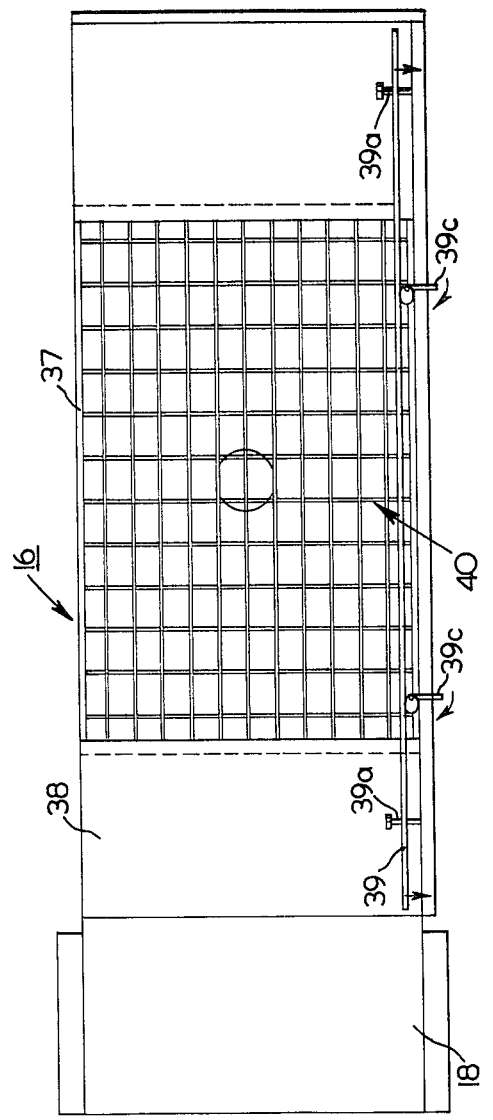
FIG. 5 is a plan view of the filter tray and receiving tanks.
Figure 6:
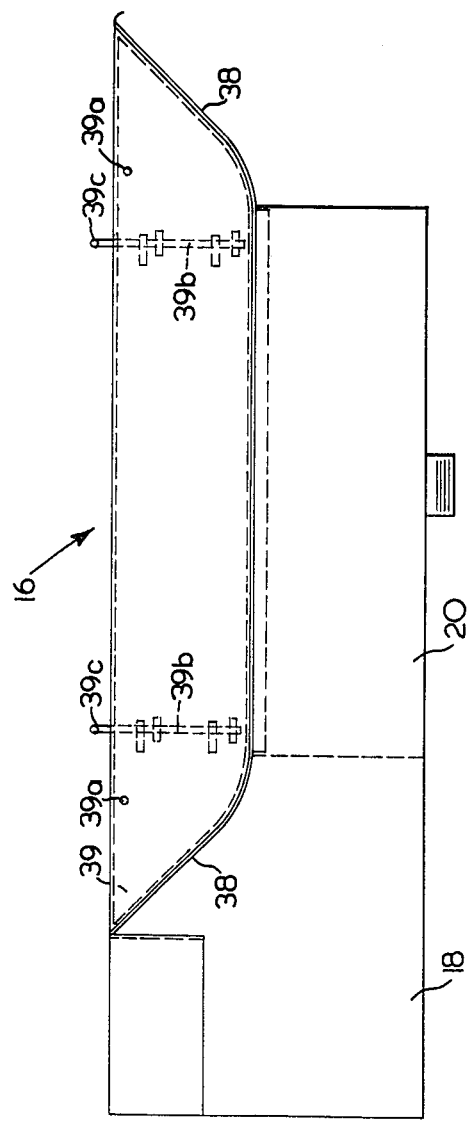
FIG. 6 is a side elevation view of the filter tray and receiving tanks.

The foam extending from the supply reel 12 overlies the above mentioned filter tray 16. The foam is, of course, in its fully expanded condition. The filter tray 16 is designed to provide good support for the foam ribbon while permitting free drainage of water therefrom into the water recovery tank 20 which is situated immediately below filter tray 16. As best seen in FIGS. 5 and 6 the filter tray 16 includes spaced apart parallel vertical side walls 37 and sloping end walls 38 which permit smooth entry and exit of the foam ribbon. The bottom of the filter tray 16 is defined by a horizontally disposed open screen structure or grid 40 which permits free drainage of clean water from the foam ribbon while providing sufficient support for the foam as to reduce the possibility of pockets forming therein or tearing occurring. The filter tray 16 is fitted with an interior vertical wall 39 (FIGS. 5 and 6) which is parallel to one of the exterior side walls 37 and is slidably suspended on horizontal pins 39a affixed to wall 37. Wall 39 is adjustable transversely toward or away from the side wall 37 by way of spaced cam means connected to vertical shafts 39b attached to wall 37. Rotation of handles 39c in the direction of the arrows in FIG. 5 rotates the cams to push the wall 39 inwardly so that it bears tightly against the foam during the filtering operation and assists in preventing contaminated liquid from by-passing the filter. When the time comes to advance the foam ribbon, the cams are rotated in the opposite direction to allow the pressure of the foam to push the wall 39 outwardly thereby reducing friction between the foam and the side walls and facilitating free movement of the foam ribbon thus reducing the possibility of the foam being torn. In order to assist in keeping the foam flat as it lies on the grid 40, idler rolls 42 are mounted at opposite ends of the grid 40 thereby to lightly contact the upper surface of the foam ribbon.

Figure 2A:
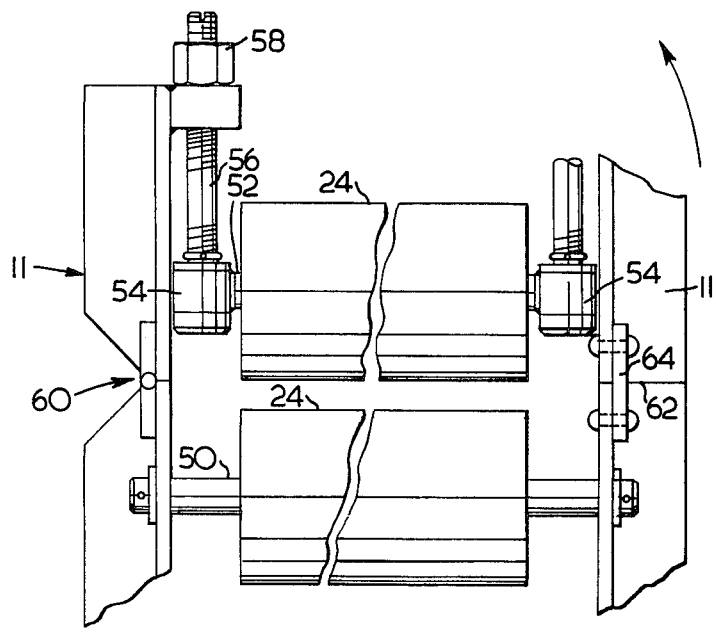
FIG. 2A is an elevation view of portions of the squeeze roll assembly looking in the direction of arrows 2A—2A shown in FIG. 2.

The roll system 24 comprises a pair of horizontally disposed squeeze rolls 24 supported by transversely spaced uprights 11 mounted on frame 10 between filter tray 16 and take-up reel assembly 14. As previously mentioned these rolls act to wring oil from the foam ribbon as the latter is advanced toward the take up reel assembly 14. FIG. 2A shows how the squeeze rolls 24 are attached to the frame uprights 11. The lower squeeze roll has its support shaft 50 mounted directly in uprights 11. The upper squeeze roll is rotatably mounted on shaft 52, the opposing ends of which are provided with sockets 54 which rotatably receive threaded vertically disposed adjustment bolts 56. The upper ends of adjustment bolts 56 pass through internally threaded lugs welded to inside surfaces of uprights 11. Hence, as adjustment bolts 56 are rotated, the width of the nip between rolls 24 will be varied. Lock nut 58 serves to prevent unwanted rotation of the adjustment bolts 56.

In order to allow the foam ribbon to be easily threaded between the rolls 24 as, for example, when the apparatus is being fitted with a fresh supply of foam ribbon, one frame upright is hinged at 60 while the other upright 11 is split at 62 and provided with a latch 64. When latch 64 is released, the upper roll 24 may be easily swung upwardly in the direction of the arrow about the pivot axis defined by hinge 60.

As mentioned previously, an oil recovery tank 18 is located directly below the squeeze rolls 24. The oil which is wrung from the foam ribbon by rolls 24 thus passes directly into this oil recovery tank. The tank 18 is provided with a suitable outlet valve so that the oil collected therein may be periodically released.

It should be noted here that the amount of oil which may be recovered by the squeeze rolls 24 depends on the viscosity of the oil which has been trapped. The lighter oils can be recovered to a relatively high degree while very heavy oils are much more difficult to recover in this manner. Bunker C oils may so completely contaminate the foam ribbon that the ribbon must be discarded after one use. Lighter oils can be recovered to a degree sufficient that the foam ribbon may be used over again several times before the degree of permanent contamination of the foam reaches a point where the foam must be discarded.

Figure 7:
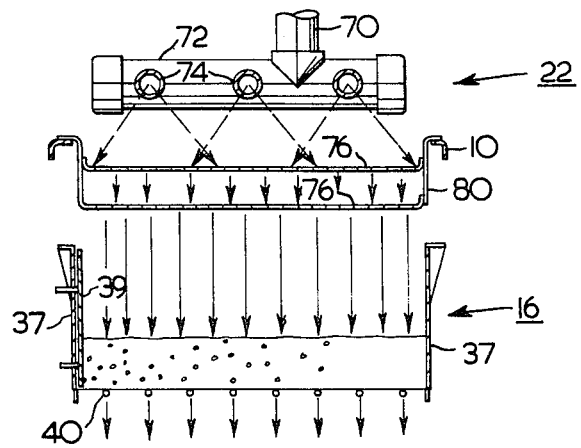
FIG. 7 is a section view taken along line 7—7 of FIG. 2 and looking in the direction of the arrows.

The infeed system 22 for uniformly spreading oil contaminated water over the section of foam ribbon lying on grid 40 of tray 16 is located above the tray 16. As clearly shown in the drawings, system 22 includes an infeed pipe 70 connected to a transverse header pipe 72. Header pipe 72, in turn, is connected to three parallel horizontally disposed spray feeder pipes 74. The lower surfaces of the pipes 74 are provided with rows of small apertures which serve to direct sprays of water angularly downwardly as illustrated in FIGS. 4 and 7 onto the upper one of a vertically spaced pair of horizontal spray distribution plates 76. Each of plates 76 is of approximately the same area as the underlying support grid 40 and substantially the entire extent of each plate 76 is provided with closely spaced apertures therethrough. In a typical case these apertures are of ⅛ inch diameter located at 3/16 inch centers. Preferably the apertures in the top plate are staggered relative to the apertures in the lower plate. These spaced apart plates 76 serve to completely break up the pattern of the spray emitted from feeder pipes 74 and act to distribute the water evenly in a gentle rain-like manner over the section of the foam ribbon supported on grid 40. This is important since by evenly distributing the contaminated water, overloading of isolated portions of the foam ribbon is avoided. It should also be noted here that the marginal edges of plates 76 are curled upwardly and welded to the marginal support frame 80 as shown in FIG. 7. This prevents any spillage of the contaminated water over the edges of the plates 76. The plates 76 are also removable from the support frame 10 as a unit for cleaning purposes.

The ribbon of filter material is of an open cell flexible polyurethane foam. This material has a high affinity for oils (both free oils and soluble oils) particularly in the middle and lower distillate ranges and provides for a high volume throughput of water per unit of area of the foam surface.

A wide variety of oils are apt to be encountered. For example, typical ship bilge water may contain a wide variety of oils such as crude oil from storage tanks, Bunker C from the fuel tanks and lubricating oil from the ships' engines, etc. The thickness of the foam ribbon is a factor to be taken into consideration. In cases where a wide variety of oils are apt to be encountered, 4 inch thick open cell polyurethane foam should provide acceptable results. If heavy oils such as Bunker C are the principle contaminants, then a thinner foam such as a 2 inch thick foam may be used while for lighter oils, thicker foams e.g. 4 or 5 inches thick, are desirable for optimum filtering efficiency. The reasons for this are that heavy oils cause eventual failure of the foam filter by blockage of the surface pores of the foam; there is little if any penetration of the heavy oil into the interior of the foam and hence there is no advantage in using a thicker foam. On the other hand, lighter oils are trapped within the foam itself, thus making the use of thicker foams desirable. Foam density is also of some significance, i.e. thicker oils are more effectively filtered with a more "open", lower density foam as for example foam with a density of approximately 1 lb/cu. ft. while lighter oils are more effectively filtered with higher density foams, e.g. foams having a density approaching about 3 lbs/cu. ft. When a variety of oils are present, as in the case of ships' bilge water, good results have been obtained with flexible open-cell polyurethane foams having a density of about 1.7 lbs./cu.ft. Commercial foams in the above density ranges usually have a cell count between 45–50 cells per linear inch. Foams in the above mentioned approximate density ranges and thicknesses are commercially available in sheet or strip form and need not be described further here.

It is to be noted that the arrangement described herein is most effective when used with conventional oil-water separators, such as centrifugal separators which effect a primary separation of the oil and water thereby to reduce the oil content to something in the order of 200 ppm (parts per million). The polyurethane foam is most effective when used as a "polishing" filter for water having a concentration of oil therein of about 200 ppm or less. In addition, it has been found that the presence of surface active agents e.g. detergents, in the oil contaminated water has a tendency to reduce the separating efficiency of the filter i.e. more oil passes through the filter; hence an effort should be made to reduce the amounts of detergent passing into the contaminated water to be filtered in order that optimum filtering efficiency may be achieved. The polyurethane foam is capable of passing a maximum flow of water therethrough when it is not under a fluid pressure head. A pressure head of liquid tends to compress the foam and reduces the flow rate therethrough. By way of example, a flexible polyurethane foam made by Monsanto Canada Limited, Type 1130, having a density of 1.10 lbs./ft.$^3$, a cell count of 45 cells per linear inch and a 4 inch thickness was found to be capable of filtering water contaminated with Marine Diesel oil (concentration 80 ppm) at a nominal rate of 20 U.S. gallons per minute/square foot. The same section of foam was used for 4 hours 40 minutes to filter 5,344 gallons. The concentration of oil in the filtered water did not exceed 15 ppm at any time.

As mentioned above, the ribbon of foam material is not moved continuously during operation but, rather, it remains stationary until such time as the filtering effectiveness of the section of ribbon overlying grid 40 decreases to a selected value, depending upon requirements. When this point is reached the take up reel assembly 14 is actuated by any suitable means to wind up enough of the foam ribbon thereon as to provide for a replacement of the section of the ribbon overlying grid 44 with a fresh length or section of foam ribbon.

Those skilled in the art will realize that various changes and modifications may be made to the specific structure described above, while still remaining within the scope of the invention as set forth in the claims appended hereto.

We claim:

1. Apparatus for filtering oil contaminated liquids and adapted for use with an elongated ribbon of flexible open cell plastics foam filtering material capable of attracting and retaining oily substances thereon, said flexible foam being subject to collapse in the event of a buildup of a head of liquid thereon with a consequent reduction in the rate of flow of the liquid therethrough, said apparatus comprising:
   (a) spaced apart supply means and take-up means each adapted to store a length of the ribbon thereon and to permit a length of the ribbon to extend therebetween, said supply means and said take-up means being arranged to allow the ribbon to be advanced from the supply means to the take-up means,
   (b) filter tray means between the supply means and the take-up means for supporting a section of the length of ribbon of foam material in a generally horizontal position and having an open grid-like bottom arranged to permit free drainage therefrom over substantially the entire area of said section of ribbon of liquids passing through said foam filtering material,
   (c) means to distribute contaminated liquid, comprising spray means and at least one perforate plate means positioned under and spaced from said spray means; the perforations of said perforate plate means being spaced and sized to provide a gentle rain of said contaminated liquid over substantially the entire area of said section, said rain being of sufficient flow rate and distribution to eliminate collapse of the plastic foam of said section,
   (d) means for receiving the filtered liquid,
   (e) means for squeezing the ribbon of foam material to remove contaminants therefrom as the ribbon is being advanced toward the take-up means, and
   (f) means for collecting the contaminants which have been squeezed from the ribbon.

2. Filtering apparatus according to claim 1 wherein said supply and take-up means each include means for rotatably supporting a core adapted to hold a wound-up length of the ribbon thereon, and means associated with each of the supply and take-up means for applying pressure to said wound up ribbon to assist in maintaining the wound up ribbon of foam in a compressed condition.

3. Filtering apparatus according to claim 2 wherein said supply and take-up means include generally upright guide means for guiding the pressure applying means towards and away from the respective lengths of wound up ribbon on said cores as the amounts of ribbon stored on the supply and take-up means are varied.

4. Filtering apparatus according to claim 1 wherein said means for squeezing the ribbon of foam include a pair of squeeze rolls defining a nip between them through which the ribbon passes when it is advanced prior to being stored on said take-up means whereby to squeeze out contaminants which have collected in the ribbon.

5. Filtering apparatus according to claim 1 wherein the filter tray includes upright side walls which inhibit bypass of contaminated liquid around the foam ribbon and sloping end walls to assist in free movement of the foam ribbon when the latter is advanced across the filter tray.

6. Filtering apparatus according to claim 5 wherein said tray includes a side wall which is movable in a direction toward or away from the foam ribbon to enable the wall to bear against the foam during a filtering operation and to also enable the wall to be moved outwardly to reduce friction between the wall and the foam when the latter is being advanced, and means for effecting movement of the wall.

7. Filtering apparatus according to claim 1 in combination with said ribbon of foam, said ribbon being an open cell flexible polyurethane foam.

8. A method of filtering oil contaminated water, comprising:
   (a) providing an elongated ribbon of flexible open cell plastics foam of a type capable of attracting and retaining oil thereon while allowing water to pass therethrough, said foam being subject to collapse in the event of a build-up of a head of liquid thereon with a consequent reduction in the rate of flow of water therethrough;
   (b) supporting a section of the ribbon in a generally horizontal manner on an open grid-like support to permit free drainage therefrom, over substantially the entire area of said section of ribbon, of water passing through the plastics foam;
   (c) distributing the oil contaminated water substantially uniformly and in a finely divided manner over substantially the entire area of said section of the ribbon with means to distribute contaminated liquid, comprising spray means and at least one perforate plate means positioned under and spaced from said spray means; the perforations of said perforate plate means spaced and sized to provide a gentle rain of said contaminated liquid over substantially the entire area of said section, said rain being of sufficient flow rate and distribution to eliminate collapse of the plastic foam of said section,
   (d) advancing said ribbon over said support after the foam ribbon has collected a certain quantity of oil whereby to position a further section of the foam ribbon over said support; and distributing the oil contaminated water over said further section of the ribbon;

(e) applying forces to said first mentioned section of the ribbon to squeeze therefrom oil collected therein, and collecting said oil;

(f) and repeating steps (d) and (e) until the desired quantity of contaminated water has been filtered.

9. The method of claim 8 wherein said ribbon is advanced over said support from a supply means toward a take-up means both of which means are capable of storing the foam ribbon in a generally compressed wound-up condition.

10. The method of claim 8 wherein said foam ribbon is passed between a pair of squeeze rolls which apply said forces to squeeze oil from the ribbon as the ribbon is being advanced to position the further section of the ribbon over the support.

11. The method of claim 8 wherein said open-cell flexible foam is of polyurethane.

12. Apparatus for filtering oil contaminated liquids, particularly water, said apparatus comprising:

(a) an elongated ribbon of flexible open cell plastics foam filtering material capable of attracting and retaining oily substances thereon, said flexible foam being subject to collapse in the event of a build-up of a head of liquid thereon with a consequent reduction in the rate of flow of the liquid therethrough, (b) spaced apart supply means and take-up means each adapted to store a length of said ribbon thereon with a length of said ribbon extending therebetween, said supply means and said take-up means being arranged to allow the ribbon to be advanced from the supply means to the take-up means, (c) a filter tray located intermediate the supply means and the take-up means and supporting a section of the length of ribbon of foam material in a generally horizontal position, the filter tray including a grid-like bottom to permit free drainage of liquid away from the foam ribbon over substantially the entire area of said section of the ribbon, and tray having upright side walls which inhibit by-pass of contaminated liquid around the section of the foam ribbon and sloping end walls to assist in free movement of the foam ribbon when the latter is advanced across the filter tray, (d) means to distribute contaminated liquid, comprising spray means and at least one perforate plate means positioned under and spaced from said spray means; the perforations of said perforate plate means being spaced and sized to provide a gentle rain of said contaminated liquid over substantially the entire area of said section, said rain being of sufficient flow rate and distribution to eliminate collapse of the plastic foam of said section, (e) means for receiving the filtered liquid, (f) means for squeezing the ribbon of foam material to remove contaminants therefrom including a pair of squeeze rolls defining a nip between them through which the ribbon passes when it is advanced prior to being stored on said take-up means whereby to squeeze out contaminants which have collected in the ribbon, and (g) means for collecting the contaminants which have been squeezed from the ribbon.

13. Filtering apparatus according to claim 12 wherein said supply and take-up means each include means for rotatably supporting a core adapted to hold a wound-up length of the ribbon thereon, and means associated with each of the supply and take-up means for applying pressure to said wound up ribbon to assist in maintaining the wound up ribbon of foam in a compressed condition.

14. Filtering apparatus according to claim 13 wherein said supply and take-up means include generally upright guide means for guiding the pressure applying means towards and away from the respective lengths of wound up ribbon on said cores as the amounts of ribbon stored on the supply and take-up means are varied.

15. Filtering apparatus according to claim 12 wherein said tray includes a side wall which is movable in a direction toward or away from the foam ribbon to enable the wall to bear against the foam during a filtering operation to eliminate by-pass of the oil contaminated water around the foam ribbon and to also enable the wall to be moved outwardly to reduce friction between the wall and the foam when the latter is being advance, and means for effecting movement of the wall.

16. Filtering apparatus according to claim 12, said ribbon being an open cell flexible polyurethane foam.

* * * * *